United States Patent [19]

Shirasaki

[11] Patent Number: 5,329,201
[45] Date of Patent: Jul. 12, 1994

[54] VIBRATION DRIVEN MOTOR

[75] Inventor: Takayuki Shirasaki, Yokohama, Japan

[73] Assignee: Canon Kabushiki Kaisha, Tokyo, Japan

[21] Appl. No.: 980,780

[22] Filed: Nov. 24, 1992

[30] Foreign Application Priority Data

Nov. 29, 1991 [JP] Japan .................. 3-316454

[51] Int. Cl.⁵ ............................ H01L 41/08
[52] U.S. Cl. ................................. 310/323
[58] Field of Search ................... 310/323, 328

[56] References Cited

U.S. PATENT DOCUMENTS

| | | | |
|---|---|---|---|
| 4,739,212 | 4/1988 | Imasaka | 310/323 |
| 4,926,085 | 5/1990 | Sawayama et al. | 310/323 |
| 4,939,404 | 7/1990 | Inagaki et al. | 310/323 |
| 5,013,956 | 5/1991 | Kurozumi et al. | 310/323 |
| 5,150,000 | 9/1992 | Imasaka et al. | 310/323 |
| 5,166,572 | 11/1992 | Ohnishi | 310/323 |
| 5,187,406 | 2/1993 | Seki | 310/323 |

Primary Examiner—Mark D. Budd
Attorney, Agent, or Firm—Fitzpatrick, Cella, Harper & Scinto

[57] ABSTRACT

A vibration wave driven motor including a vibration member having a friction contact surface and a rotor having a contact surface, which is in contact with the vibration member. The contact surface of the rotor consists of a composite resin filled and blended with a wear modifier and a friction regulator, as needed, and has a Rockwell hardness of 80 to 110. The friction surface of the vibration member is formed by a multi-layered film of a nickel intermetallic compound having a Vickers hardness of 800 to 1,200.

11 Claims, 2 Drawing Sheets

VIBRATION DRIVEN MOTOR

BACKGROUND OF THE INVENTION

1. Field of the Invention

The present invention relates to a vibration driven motor for generating a travelling vibration wave in a vibration member upon application of a voltage to an electro-mechanical energy conversion element, and causing relative movement between the vibration member and a member contacting it by frictional driving and, more particularly, to a high-output type vibration driven motor.

2. Related Background Art

In a conventional vibration driven motor, especially in a high-output type vibration driven motor, a thin annular piezo-electric element is fixed on the rear surface of an annular vibration member substrate formed of, e.g., stainless steel, and a super hard material containing tungsten carbide and cobalt is spray-coated on the front surface of the substrate and is polished to form a hard sliding surface, thus constituting a vibration member. On the other hand, a member contacting the vibration member is constituted by fixing, on a support member of, e.g., an aluminum alloy, a slide member having a reinforced composite resin layer prepared by filling and blending a reinforcement material such as a carbon fiber in a thermoplastic resin having a glass transition point of 100° C. or higher, e.g., heat-resistant resins such as polyimide (PI), polyamide imide (PAI), polyether imide (PEI), polyether ether ketone (PEEK), polyether sulfone (PES), polyarylate (PAR), polysulfone (PSF), liquid-crystal aromatic polyester (LCP), or the like, or nonthermoplastic aromatic polyimide (PI). The vibration member and the contact member move relative to each other by frictional driving caused by a travelling vibration wave generated in the vibration member.

The relative movement between the contact member and the vibration member may be attained while either of these members is fixed or movable. In the following description of the present specification, however, the vibration member is fixed in position, and the contact member is movable for the sake of simplicity. Therefore, the contact member will be referred to as a "movable member" hereinafter.

In the conventional vibration driven motor, the slide member containing as a base material a thermoplastic resin having a glass transition point of 100° C. or higher or a nonthermoplastic aromatic polyimide resin is used as the reinforced composite resin layer forming a portion of the movable member for the following reasons. That is, these heat-resistant resins have small temperature dependency as a material physical property, do not suffer from a torque-down phenomenon due to softened resins caused by a temperature rise upon driving of the motor, and can stabilize performance precision of the motor.

A reinforcement material such as a carbon fiber is filled in the resin materials for the following reasons. First, the property of the slide surface of the movable member is always stabilized with respect to the slide surface of the vibration member, which surface is formed of the super hard material containing, e.g., tungsten carbide and cobalt, and sufficient wear resistance in a driving operation for a long period of time can be assured. Second, the material physical property values such as elasticity, hardness, and the like of the slide member are increased to improve the performance (e.g., an output) of the motor. Third, the heat conductivity of the slide member is increased to improve the performance (e.g., efficiency) of the motor.

As described above, since the reinforced composite resin prepared by filling a carbon fiber in a heat-resistant thermoplastic resin having a glass transition point of 100° C. or higher, or a nonthermoplastic polyimide resin is used in the slide member for providing the slide surface of the movable member in the vibration driven motor, the performance and precision of the motor can be stabilized against a temperature rise upon driving of the motor, and the wear resistance against the super hard material forming the slide surface of the vibration member is sufficient even after a driving operation for a long period of time. Furthermore, motor performance such as output efficiency can exhibit a high value.

However, when the slide surface of a composite resin layer of a movable member, which layer contained a heat-resistant thermoplastic resin or nonthermoplastic aromatic polyimide resin, and was reinforced by filling a carbon fiber, was actually brought into contact with a hard slide surface, formed of a super hard material, of a vibration member under pressure, and a driving operation was started under rated operation conditions of, e.g., 4 kg·cm and 100 rpm, torque nonuniformity of about 5% occurred with respect to the rated torque value, and further improvements were demanded.

Furthermore, when the driving operation was performed for as long as 1,000 hours under the rated relatively high-output conditions, a wear of 3 $\mu$m or more was observed even on the carbon fiber-reinforced composite resin layer, and further improvements of frictional materials were demanded.

Moreover, since the spray-coated friction surface having a film thickness of 50 to 100 $\mu$m and formed of tungsten carbide and cobalt had relatively poor heat conductivity, thermal radiation performance to the movable member constituted by the composite resin layer and the support member was poor, and it caused a temperature rise of the vibration member.

SUMMARY OF THE INVENTION

The present invention has been made in consideration of the above situation, and has as its object to provide a vibration driven motor, which can minimize a torque variation (nonuniformity) under high-temperature, high-load conditions. The motor includes a vibration member having a super hard (tungsten carbide) friction surface, which surface has high density and relatively high toughness and is free from scratches and hit marks, and has a high wear resistance in correspondence with either a fiber or non-fiber type composite resin.

It is another object of the present invention to provide a vibration driven motor having improved efficiency, in which the friction surface of the vibration member has a high corrosion resistance, i.e., free from rust, and which can suppress a temperature rise of the vibration member by the friction surface having improved heat conductivity.

It is still another object of the present invention to provide a high-output type vibration driven motor, which allows easy mass-production by finding out a low-cost hardening treatment method for a friction surface in place of spray coating of tungsten carbide and cobalt in the prior art.

According to one aspect of the present invention, in a vibration driven motor in which a member comprising a composite resin layer for providing a contact surface with a vibration member for generating a travelling vibration wave is brought into contact with the vibration member under pressure, and the vibration member and the member contacting it under pressure are relatively moved by frictional driving by the travelling vibration wave generated in the vibration member, the composite resin layer is formed of a composite resin, which is prepared by filling and blending a fiber or non-fiber type wear modifier and a friction regulator as needed in a base material containing a thermoplastic resin having a glass transition point of 100° C. or higher or a nonthermoplastic aromatic polyimide resin, and has a Rockwell hardness ($H_RM$) of 80 to 110. On the other hand, the vibration member as a frictional member is formed of martensite-based stainless steel, and a multi-layered film of an intermetallic compound of nickel, which has relatively high hardness and high toughness is formed on the friction surface of the vibration member to have a thickness falling within a range between 10 $\mu$m and 50 $\mu$m and, more preferably, a thickness of about 20 $\mu$m, thereby obtaining a super hard friction surface having a Vickers hardness of 800 to 1,200.

The aspect of the present invention is typically constituted as a vibration driven motor, which generates a travelling vibration wave in an annular vibration member provided with a driving phase comprising a piezoelectric element upon application of a voltage to the driving phase, thereby frictionally driving a movable member contacting the vibration member under pressure. The movable member is constituted by a support member formed of, e.g., an aluminum alloy having high heat conductivity, and the above-mentioned composite resin layer, integrated with the support member, for providing a slide surface contacting the vibration member.

According to one aspect of the present invention, the composite resin layer of the vibration driven motor is filled and blended with the fiber or non-fiber type reinforcement material as a wear modifier.

According to one aspect of the present invention, the composite resin is prepared as follows. That is, a thermoplastic resin, which has a super heat resistance, large elasticity, and high hardness, and has a glass transition point of 100° C. or higher, or a nonthermoplastic aromatic polyimide resin is used as a base material resin, and a fiber type reinforcement material such as a carbon fiber, a graphite fiber, a carbon whisker, a potassium titanate whisker, and the like, or a non-fiber type reinforcement material such as spheroidal or granular glassy carbon, a metal molybdenum powder, a calcium carbonate powder, and the like is filled in the base material resin as a wear modifier. In addition, a solid-state lubricant such as a fluorocarbon resin, graphite, lead monoxide, and the like is blended as a friction regulator as needed.

As the typical friction regulator, it is especially preferable that 1 to 12 wt % of a fluorocarbon resin such as ethylene tetrafluoride and 10 wt % or less of a lead monoxide powder with respect to the base material in either case are simultaneously added.

The ethylene tetrafluoride resin is a low-friction coefficient resin. For this reason, when the filling amount becomes too much, the coefficient of friction of the obtained material is decreased, but the material strength and the wear resistance are lowered. Thus, this resin is filled within the above-mentioned range.

The lead monoxide powder and the ethylene tetrafluoride resin powder are effective as a solid-state lubricant for compensating for the lubricity of the thermoplastic resin or nonthermoplastic resin as the base material. When the slide surface of the composite resin layer is frictionally driven on the slide surface of the vibration member, the lead monoxide powder has a function of transferring a coat of the ethylene tetrafluoride resin onto the slide surface of the vibration member, and is a material effective for always stabilizing the coefficient of friction in sliding motion at high temperature.

The powders of a lead compound (e.g., the above-mentioned lead monoxide powder), and a fluorocarbon resin (e.g., the ethylene tetrafluoride resin) preferably have an average particle size of 20 $\mu$m or less so as to assure a certain wear resistance and material strength of the composite resin layer in consideration of adhesion properties with the thermoplastic resin or nonthermoplastic aromatic polyimide resin as the base material.

Normally, the wear modifier must be filled and blended as a reinforcement material in the composite resin layer.

Since the composite resin filled with a carbon fiber has high hardness, large elasticity, and high heat conductivity, the output or efficiency of the motor is high, and the wear resistance of the composite resin is very high.

A non-fiber type wear modifier is preferably filled in the composite resin layer, as needed. More specifically, the non-fiber type wear modifier includes amorphous non-oriented spheroidal or granular glassy carbon, or the like, which is prepared by heat-treating a thermosetting resin at about 800 to 2,000° C., and has an average particle size of 5 to 20 $\mu$m. For example, it is especially preferable that 10 to 50 wt % of spheroidal glassy carbon are filled and blended in the base material.

A transition metal powder can be further filled and blended in the composite resin layer of the present invention for the purpose of improving the wear resistance and improving stability of the slide surface against a change in temperature. More specifically, the transition metal powder includes tungsten, molybdenum, chromium, cobalt, titanium, and nickel. For example, at least one of 40% or less of a tungsten powder (10 $\mu$m or less), 15% or less of a molybdenum powder (5 $\mu$m or less), and the like may be added to the base material.

Upon filling of the wear modifier, the following effects can be expected. First, even when the vibration member has a slide surface of a super hard material, the property of the slide surface of the movable member is always stabilized, and the slide surface can exhibit sufficient wear resistance in a driving operation for a long period of time. Second, the material physical properties such as elasticity of the slide surface of the movable member can be increased, and the motor performance (e.g., the output) can be improved. Third, the heat conductivity of the composite resin layer can be improved, and the motor performance (e.g., efficiency) can be improved.

Furthermore, as the wear modifier, a powdery reinforcement material such as calcium carbonate, magnesium carbonate, and the like, which have hardnesses lower than those of the carbon fiber, spheroidal glassy carbon, metal molybdenum powder, and the like may be filled. In this case, such a reinforcement material is filled in the base material at 30 wt % or less.

The base material resin of the composite resin generally adopts a thermoplastic resin having a high heat resistance, i.e., a thermoplastic resin having a glass transition point of 100° C. to 280° C. and, preferably 250° C. to 280° C.

Examples of such a thermoplastic resin include, e.g., polyimide (PI), polyamide-imide (PAI), polyether imide (PEI), polyether ether ketone (PEEK), polyether sulfone (PES), polyarylate (PAR), polysulfone (PSF), liquid-crystal aromatic polyester (LCP), and the like. More specifically, polyimide (PI) is the most preferable. This thermoplastic polyimide "TPI" (trade name: available from Mitsui Toatsu Chemicals, Inc.) has an especially high heat resistance (glass transition point=250° C., melting point=382° C.) among thermoplastic resins. As another base material resin of the composite resin layer, a nonthermoplastic aromatic polyimide resin may also be used.

The aromatic polyimide resin is a nonthermoplastic resin, and includes a condensation product ("Ubilex" (trade name: Ube Industries, Ltd.)) of biphenyl tetracarboxylic acid dianhydrate and aromatic diamine. This condensation product has characteristics at high temperature superior to those of a wide variety of plastics. For example, the condensation product has a glass transition point of 295° C. and a thermal deformation temperature of 350° C. at a load of 18.8 kg/cm$^2$, and exhibits a mechanical strength equivalent to that of general engineering plastics at normal temperature even at a continuous use temperature of 260° C.

When the above-mentioned high-hardness type composite resin slide member was combined with a conventional vibration member spray-coated with tungsten carbide and cobalt, and when the friction surface was polished by abrasive grains of carbon whisker (SIC), recess portions were formed in the friction surface, and the spray-coated surface was broken, and so on, since the hardness of the friction surface of the vibration member was 1,000 or more (Vickers hardness), and the spray-coated surface of tungsten carbide and cobalt had low toughness. As a result, wear was often promoted. In addition, since the spray-coated material containing tungsten carbide and cobalt has relatively low heat conductivity (0.15 kcal/cm sec °C.), it suffers from insufficient heat radiation, and poses a problem in terms of a temperature rise of the vibration member.

According to the present invention, a multi-layered film of an intermetallic compound of nickel, which has relatively high hardness and high toughness, is formed on the friction surface of the vibration member formed of martensite-based stainless steel so as to have a thickness falling within a range of 10 μm and 50 μm and, preferably, a thickness of about 20 μm, thereby obtaining a super hard friction surface having a Vickers hardness (Hv) of 800 to 1,200. In this multi-layered film, the first layer is formed as an alloy film of nickel and phosphorus, and the second layer as a surface layer is formed as an alloy layer of nickel, phosphorus, and tungsten. The multi-layered film is subjected to a thermal diffusion treatment in an atmosphere of 400° to 500° C. so as to form a two-layered film of an intermetallic compound containing about 90 wt % of nickel. This two-layered film has a surface hardness of 800 to 1,200 (micro-Vickers), has higher density and sufficient toughness, and also has a high corrosion resistance.

As the martensite-based stainless steel, 13%-chromium steel (JIS: sus420J2), 17%-chromium steel (JIS: sus630) as deposition-hardened stainless steel, or the like is used. The martensite-based stainless steel has a thermal expansion coefficient of about $10 \times 10^{-6}$ deg$^{-1}$, and has a small thermal expansion coefficient difference from a thin disk-like piezo-electric element adhered to the rear surface of the vibration member. For this reason, the martensite-based stainless steel can advantageously prevent peeling or destruction of the piezo-electric element even when the heat generation amount is increased.

The martensite-based stainless steel may be subjected to a heat treatment to remove stress, as needed, before the above-mentioned film formation materials are deposited on the friction surface.

More specifically, when the machined vibration member is formed of 13%-chromium steel (sus420J2), it is subjected to a stress removal heat treatment at 600° C. for 3 hours; when the vibration member is formed of 17%-chromium steel (sus630), it is subjected to a deposition-hardening heat treatment at 470° C. to 490° C. In either case, after the friction surface is finished (ground or polished), the above-mentioned film formation materials are deposited.

As compared to a conventional film which is formed by plasma-spray-coating a composite powder prepared by blending 12 wt % of metal cobalt in a ceramic (tungsten carbide), and has a porosity of about 1% and a Vickers hardness of about 1,000, the multi-layered film of the intermetallic compound of the present invention has almost a zero porosity, very high density and toughness, and a Vickers hardness of about 1,000. That is, the multi-layered film of the present invention has excellent corrosion resistance and wear resistance.

DETAILED DESCRIPTION OF THE PREFERRED EMBODIMENTS

Figure 1:
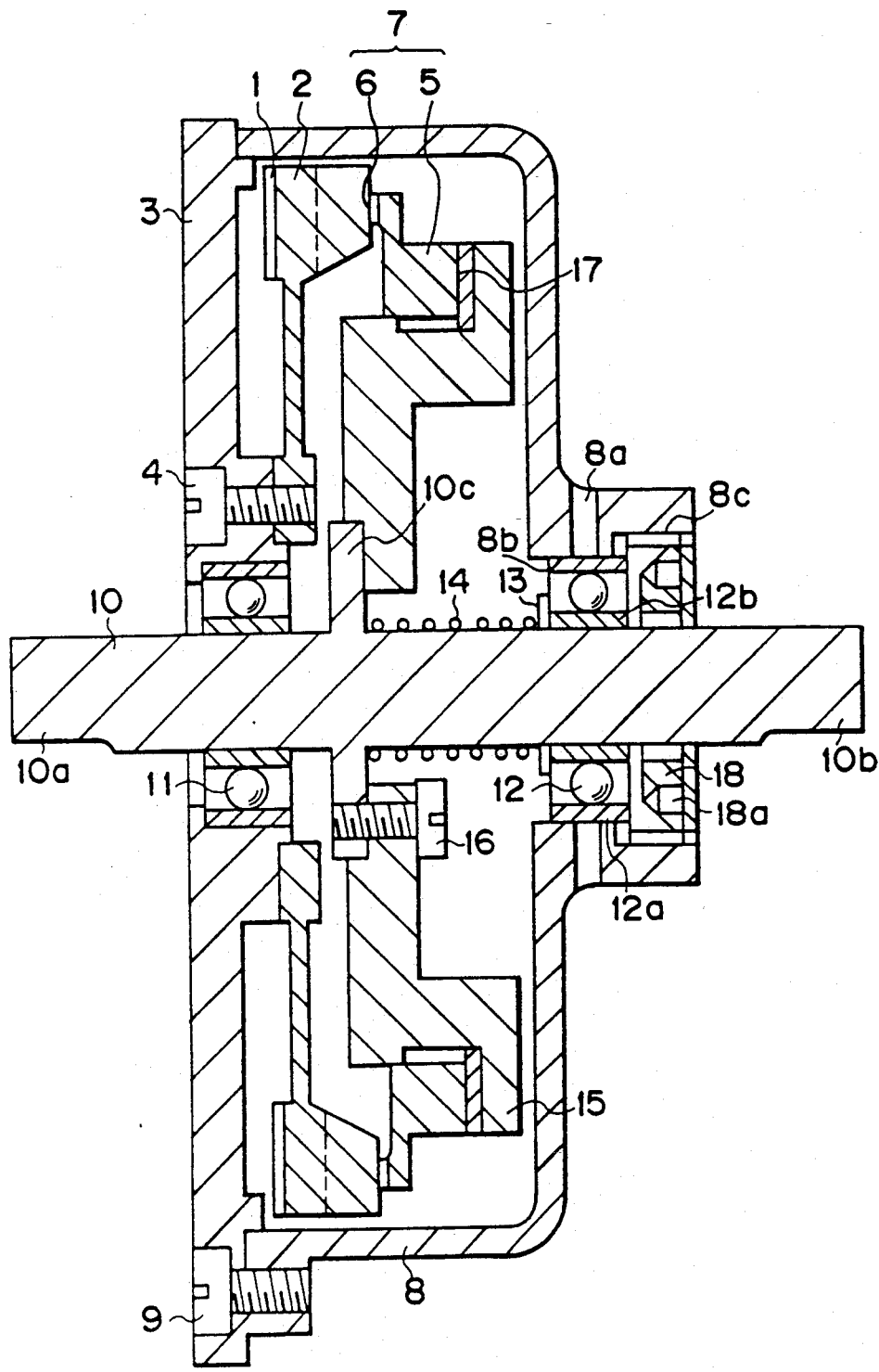
FIG. 1 is a sectional view showing an embodiment of a vibration driven motor according to the present invention.

FIG. 1 is a longitudinal sectional view showing an embodiment of a vibration driven motor according to the present invention.

Referring to FIG. 1, an annular vibration member substrate 2 is formed of a metal member such as stainless steel. A thin annular piezo-electric element group 1 as electro-mechanical energy conversion elements is concentrically fixed by an adhesive on the rear surface of the substrate 2. A large number of circumferential grooves are axially formed in the slide surface as the front surface in an interdigital pattern so as to obtain a large vibration amplitude of a travelling vibration wave. A housing 3 is formed of a metal material having high heat conductivity. The housing 3 is provided with a first ball bearing 11 at its central portion, and the vibration member 2 is fixed by a screw 4 concentrically with the central axis of the first ball bearing 11.

An output shaft 10 is formed with a flange portion 10c at its intermediate portion. One end portion 10a of the output shaft 10 extends through and is supported by an inner ring of the first ball bearing 11 so as to be axially slidable, and the other end portion 10b thereof extends through an inner ring of a second ball bearing 12 (to be described later) and an axial hole of a spring pressure adjusting nut member 18 (to be described later) so as to be axially slidable and rotatable. A disk-like intermediate member 15 is fixed to the flange portion 10c of the output shaft 10 by a screw 16. A ring-shaped movable member 7 is concentrically fitted on and fixed to the outer peripheral edge portion of the intermediate member 15.

The movable member 7 is constituted by a ring-shaped support member 5 formed of a metal such as an aluminum alloy having high heat conductivity, and a slide member 6 concentrically adhered to the surface of the support member 5 by a heat-resistant epoxy-based adhesive. The slide member 6 is formed as a 1-mm thick ring-shaped composite resin layer having a composition and structure, as will be described later. The slide member 6 contacts the slide surface of the vibration member 2.

The movable member 7 is supported by the intermediate member 15 via a rubber elastic seat member 17 provided on the bottom portion of the movable member 7. The axial load generated by a coil-like compression spring member 14 elastically inserted between the flange portion 10c of the output shaft 10 and the second ball bearing 12 is axially applied to the support member 5 via the elastic seat member 17, so that the slide surface of the vibration member 2 is pressed against the slide member 6 of the movable member 7.

A housing cover 8 of the vibration driven motor is fixed to the housing 3 by a screw 9. A bearing fitting hole 8b formed at the central portion of the housing cover 8 axially slidably receives the second ball bearing 12. A threadable lock portion 8c is formed on the inner circumferential surface adjacent to the bearing fitting hole 8b, and is threadably engaged with the spring pressure adjusting nut member 18. The spring pressure adjusting nut member 18 contacts only an outer ring 12a of the second ball bearing 12, and an inner ring 12b of the second ball bearing 12 is arranged on the output shaft 10 to be axially slidable and rotatable. When two insertion rods formed at the distal end portion of a jig (not shown) are inserted in two small holes 18a and 18b formed in the spring pressure adjusting nut member 18, and are rotated clockwise, the spring pressure adjusting nut member 18 presses the second ball bearing 12 in the left direction in FIG. 1 while being moved in the left direction to contract the compression spring member 14, thereby increasing the spring force. When the insertion rods are rotated counterclockwise, the compression spring member 14 is expanded to decrease the spring force. Thus, the axial load of the output shaft 10 can be adjusted by means of flexure of the spring. After the axial load of the output shaft 10 is adjusted, an adhesive is normally filled from a small hole 8a of the housing cover 8 to fix the outer ring 12a of the second ball bearing 12 on the housing cover 8.

A spacer 13, which contacts only the inner ring 12b of the second ball bearing 12, is arranged between one end of the compression spring member 14 and the second ball bearing 12. One end of the compression spring member 14 contacts the spacer 13, so that the output shaft can be smoothly rotated without an interference. Note that the spring constant of the compression spring member 14 is preferably as small as possible so as to decrease a variation in axial load with respect to flexure.

Figure 2:
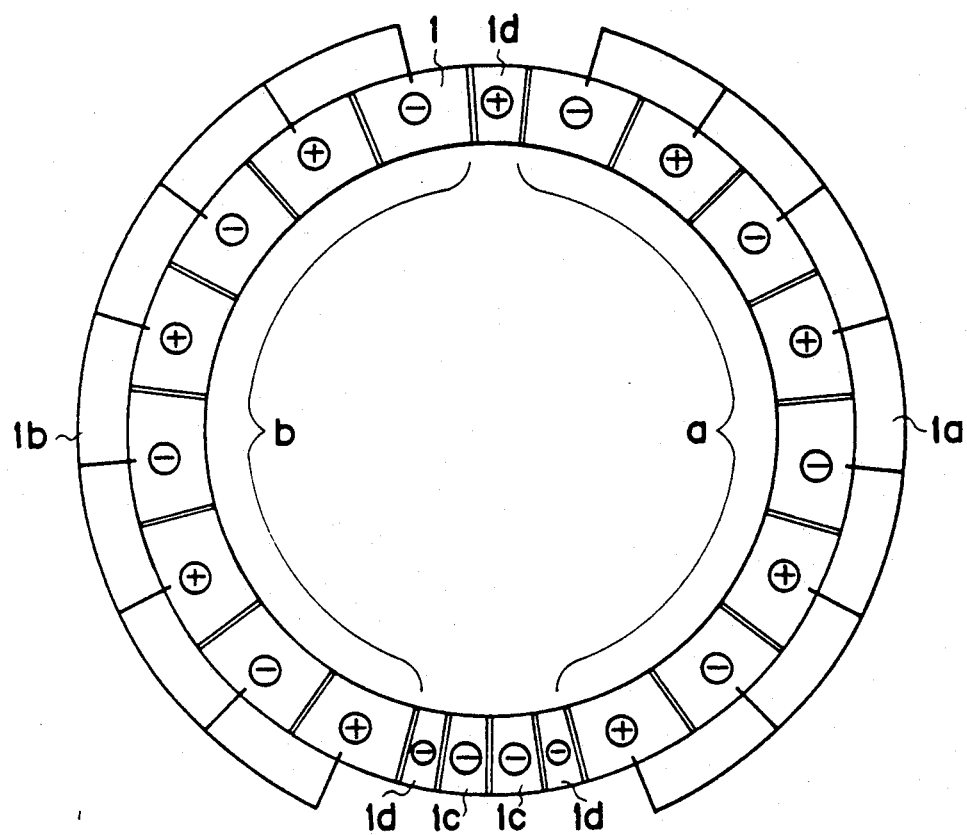
FIG. 2 is a plan view showing an arrangement of a piezo-electric element in FIG. 1.

As shown in FIG. 2, the piezo-electric elements 1 of the vibration member 2 are constituted by driving A and B piezo-electric elements 1a and 1b which are polarized, as shown in FIG. 2, two vibration detection piezo-electric elements 1c for detecting a vibration state, and ground common electrodes 1d. The B piezo-electric elements 1b are arranged at a pitch shifted by ¼ a wavelength ($\lambda$) of a frequency to be excited in the A piezo-electric elements 1a.

When high-frequency voltages having a 90° phase difference therebetween are respectively applied to the A and B piezo-electric elements 1a and 1b by a known method, a travelling vibration wave is generated in the surface of the vibration member 2 according to known principles, and the movable member 7 pressed against the vibration member 2, as described above, is frictionally driven, thus rotating the output shaft 10 via the intermediate member 15.

In order to examine the materials of the slide member 6 as the composite resin layer of the movable member 7 in the vibration driven motor with the above-mentioned arrangement, ring-shaped slide members (an outer diameter=68 mm, an inner diameter=64 mm, and a thickness=1 mm) having compositions shown in Table 1 were adhered and fixed to annular support members of an aluminum alloy using an epoxy-based adhesive.

Note that the slide members of respective examples are prepared by blending corresponding fillers described in Table 1 in nonthermoplastic polyimide (PI) or a thermoplastic resin having a glass transition point of 100° C. or higher as a base material as follows.

Example 1: 15 wt % of a PAN-based carbon fiber ("Toreca" (trade name: TORAY INDUSTRIES, INC.)) having a diameter of 7 $\mu$m and a length of about 100 $\mu$m were filled and blended in a nonthermoplastic aromatic polyimide resin ("Ubilex" (trade name: Ube Industries, Ltd.)) as a condensation product of biphenyl tetracarboxylic acid dianhydrate and aromatic diamine as a base material. The resultant mixture was subjected to compression-molding, and was cut into a 1-mm thick ring-shaped slide member.

Example 2: 20 wt % of glassy carbon (2) ("Carbon Microbeads" (trade name: Nippon Carbon Co., Ltd.)) having an average particle size of 10 $\mu$m were filled and blended in place of the carbon fiber in Example 1, and a slide member was manufactured following the same procedures as in Example 1.

Example 3: 10 wt % of glassy carbon of Example 2, 6.5 wt % of a metal molybdenum powder, and 9.4 wt % of an ethylene tetrafluoride resin (PTFE) were filled and blended in place of the carbon fiber in Example 1 to manufacture a slide member.

Example 4: A slide member was manufactured following the same procedures as in Example 3, except that another glassy carbon (1) ("Bellpearl" (trade name: KANEBO, LTD.)) having an average particle size of 15 to 20 $\mu$m replaced 10 wt % of glassy carbon of Example 3.

Example 5: A slide member was manufactured following the same procedures as in Example 3, except that glassy carbon (2) as the reinforcement material was omitted.

Example 6: 8.5 wt % of an ethylene tetrafluoride resin (PTFE) powder and 6 wt % of a lead monoxide powder were filled and blended as friction regulators in the nonthermoplastic polyimide resin of Example 1 to manufacture a slide member.

Example 7: 30 wt % of a pitch-based carbon fiber ("Kureha Carbon Fiber Chop" (trade name: Kureha Chemical Industry Co., Ltd.)) were filled and blended in thermoplastic polyimide ("TPI" (trade name: Mitsui Toatsu Chemicals, Inc.)). The resultant mixture was subjected to injection-molding to manufacture a 1-mm thick ring-shaped slide member.

Example 8: 30 wt % of glassy carbon (2) were filled and blended in place of the carbon fiber of Example 7, and a slide member was manufactured following the same procedures as in Example 7.

Example 9: 12 wt % of glassy carbon (1) and 3 wt % of an ethylene tetrafluoride resin powder were filled and blended in place of the carbon fiber of Example 7, and a slide member was manufactured following the same procedures as in Example 7.

Example 10: A slide member was manufactured following the same procedures as in Example 7, except that 10 wt % of a calcium carbonate powder and 7 wt % of an ethylene tetrafluoride resin powder were filled and blended.

Example 11: 30 wt % of a carbon fiber and 5 wt % of an ethylene tetrafluoride resin powder were filled and blended in thermoplastic polyether ether ketone ("Victolex PEEK" (trade name: I.C.I)). The resultant mixture was subjected to injection-molding to manufacture a 1-mm thick ring-shaped slide member.

Example 12: A slide member was manufactured following the same procedures as in Example 10, except that 30 wt % of a potassium titanate whisker ("Tismo" (trade name: Otsuka Kagaku Yakuhin K.K.)) were filled and blended in place of the carbon fiber of Example 11.

Example 13: 30 wt % of a carbon fiber were filled and blended in thermoplastic polyether sulfone ("Victolex PES" (trade name: I.C.I)), and the resultant mixture was subjected to injection-molding to manufacture a 1-mm thick ring-shaped slide member.

Example 14: 30 wt % of a carbon fiber were filled and blended in aromatic polyester ("Vectra" (trade name: Ceranese)) as a thermoplastic resin exhibiting liquid-crystal characteristics, and the resultant mixture was subjected to injection-molding to manufacture a 1-mm thick ring-shaped slide member.

The flexural elasticity and Rockwell hardness were measured based on the following method by preparing a plate member.

Measurement of flexural elasticity: a 3.2-mm thick plate based on ASTM D792 was used.

Measurement of Rockwell hardness: based on ASTM D785.

As can be seen from Table 1, in thermal characteristics of the composite resins, the glass transition point of the nonthermoplastic aromatic polyimide is 295° C., that of the thermoplastic polyimide is 250° C., and a composite resin using these two resin as base materials is formed to have a super high heat resistance.

As can also be seen from Table 1, the composite resins of Examples 1, 7, 11, 13, and 14 filled and blended with the carbon fiber as a reinforcement material for improving lubricity and heat conductivity have particularly large elasticity values.

Although the flexural elasticity values of Examples 4, 9, and the like filled and blended with the granular glassy carbon (1) become larger than those of the original base material resins, their hardness values tend to decrease.

On the other hand, the flexural elasticity values and hardness values of Examples 2, 3, 8, and the like filled and blended with the spheroidal glassy carbon (2) tend to improve as compared to Examples 4 and 9 filled and blended with the glassy carbon (1).

The flexural elasticity values or hardness values of Examples 3, 4, 5, 6, 9, 10, and the like filled and blended with the ethylene tetrafluoride resin as a low-friction coefficient resin as a friction regulator should be decreased in correspondence with the filling amount of the ethylene tetrafluoride resin.

Table 2 below summarizes the types of materials, hardening treatments of friction surfaces, and hardness

TABLE 1

| | Base Material Resin | Filler (Wt %) | | Glass Transition Point (°C.) | Flexural Elasticity (kg/cm$^2$) | Rockwell Hardness (H$_R$M) |
|---|---|---|---|---|---|---|
| | | Wear Modifier | Friction Regulator | | | |
| Example | | | | | | |
| 1 | Nonthermoplastic PI | CF (15) | Not Filled | 295 | 80,000 | 109 |
| 2 | Nonthermoplastic PI | GC(II) (20) | Not Filled | 295 | 54,000 | 107 |
| 3 | Nonthermoplastic PI | GC(II) (10), Mo (6.5) | PTFE (9.4) | 295 | Not Measured | 105 |
| 4 | Nonthermoplastic PI | GC(I) (10), Mo (6.5) | PTFE (9.4) | 295 | Not Measured | 102 |
| 5 | Nonthermoplastic PI | Mo (6.5) | PTFE (9.4) | 295 | 37,900 | 107 |
| 6 | Nonthermoplastic PI | Not Filled | PTFE (8.5), PbO (6) | 295 | 22,700 | 104 |
| 7 | Thermoplastic PI | CF (30) | Not Filled | 250 | 180,000 | 105 |
| 8 | Thermoplastic PI | GC(II) (30) | Not Filled | 250 | 51,000 | 98 |
| 9 | Thermoplastic PI | GC(I) (12) | PTFE (3) | 250 | 40,000 | 83 |
| 10 | Thermoplastic PI | CaCO$_3$ (10) | PTFE (7) | 250 | Not Measured | 86 |
| 11 | Thermoplastic PEEK | CF (30) | PTFE (5) | 144 | 137,000 | 102 |
| 12 | Thermoplastic PEEK | TiSMo (30) | PTFE (5) | 144 | 62,700 | 92 |
| 13 | Thermoplastic PES | CF (30) | Not Filled | 230 | 165,000 | 97 |
| 14 | Thermoplastic Aromatic Polyester | CF (30) | Not Filled | 120 | 290,000 | 83 |

In Table 1, PI: polyimide, PEEK: polyether ether ketone, PES: polyether sulfone, CF: carbon fiber, GC(I): glassy carbon (1) "Bellpearl", GC(II): glassy carbon (2) "Carbon Microbeads", Mo: metal molybdenum, CaCO$_3$: calcium carbonate, TiSMo: potassium titanate whisker, PTFE: ethylene tetrafluoride, and PbO: lead monoxide.

Table 1 shows the glass transition point, flexural elasticity, and Rockwell hardness (H$_R$M) of the composite resin.

values measured by a micro-Vickers hardness meter of a conventional vibration member (Comparative Example) and a vibration member (Example) of the present invention.

TABLE 2

| | Martensite-based Stainless Steel | Hardening Treatment & Film Thickness (μm) | Vickers Hardness (Hv) |
|---|---|---|---|
| Comparative Example | SUS420J2 (13% Cr) | Spray-coating: WC + 12% wt Co (80) | 11,000 |
| Example | SUS420J2 (13% Cr) | Deposition: | 900 |

TABLE 2-continued

| Martensite-based Stainless Steel | Hardening Treatment & Film Thickness (μm) | Vickers Hardness (Hv) |
|---|---|---|
| | Nickel-based Intermetallic Compound (20) | |

Both the Example and Comparative Example were vibration members formed of 13%-chromium steel (JIS: sus420J2), were subjected to a heat treatment (600° C. for 3 hours) for removing stress after machining, and were then subjected to corresponding hardening treatments.

In the Comparative Example, a 12 wt % cobalt-tungsten carbide powder (71VFNS available from Daiichi Meteyu-sha) was plasma-spray-coated to form a 100-μm thick coat, and thereafter, the coat was polished to form a mirror-surface coat having a thickness of about 80 μm. It was confirmed as a result of measurement by an interferometer that flatness of the friction surface of this vibration member was 1 μm or less.

In the hardening treatment of the Example, the first layer was formed as an alloy layer of nickel and phosphorus, the second layer as a surface layer was formed as an alloy layer of nickel, phosphorus, and tungsten, and the multi-layered film was subjected to a thermal diffusion treatment in an atmosphere of 400° to 500° C. so as to form a two-layered film of a super hard intermetallic compound (Clean S Treatment: Showa Denko K.K.). The 20-μm thick second layer was polished to form a mirror-surface coat having a flatness of 1 μm or less and a thickness of about 15 μm. The hardness was measured at a load of 25 grf using a micro-Vickers hardness meter, and the measurement results were as shown in Table 2. The hardness of the Comparative Example was about 1,000, while the friction surface hardness of the Example was equivalent to that of the Comparative Example, i.e., about 900.

The vibration member 2 was formed as a ring-shaped member having an axial dimension of 7 mm.

shown in FIG. 1, which are manufactured by combining the composite resin slide members shown in Table 1 and the vibration member shown in Table 2.

Evaluation items include the initial wear amounts of the vibration member and the composite resin, the torque nonuniformity, the rated output, and the maximum efficiency.

(Initial Wear): Generation of scratches or the wear amount of the friction surface of the vibration member and the wear amount of the slide surface of the composite resin layer were measured after a continuous operation for 100 hours was performed under rated results were classified as "middle", "small", and "minimal".

(Torque Nonuniformity): The torque nonuniformity when the motor was continuously driven for 20 minutes under the rated conditions was measured using a low-distortion type torque detector (available from ONO SOKKI Co., Ltd.), and the measurement results were classified as ◯ and Δ.

(Rated Output, Maximum Efficiency): Torque vs. output and torque vs. efficiency motor characteristics were measured using the above-mentioned low-distortion type torque detector to obtain the output and the maximum efficiency at the rated torque (4 kg·cm), and the measurement results were classified as ⊚, ◯, and Δ.

In addition to the above evaluations, the vibration member of Table 2 was assembled in a motor, and a corrosion-resistance test was conducted.

A heat cycle test for repeating a motor driving operation three times in an environment at a temperature of 60° C. and a humidity of 60%, and in an environment at a temperature of −30° C. was performed, and the motor was left to stand for a while. Thereafter, the motor was disassembled, and rust on the friction surface of the vibration member was observed.

As a result of this test, no rust was observed on the deposition friction surface of the Example as well as the spray-coated friction surface of tungsten carbide and cobalt of the Comparative Example.

TABLE 3

| Vibration Member Hardening Treatment | Composite Resin | Initial Wear | | Torque Nonuniformity | Rated Output | Maximum Efficiency |
|---|---|---|---|---|---|---|
| | | Vibration Member | Composite Resin | | | |
| Comparative Example WC—CO | Example 1 | Not Observed | Minimal | Δ | ◯ | ◯ |
| | Example 3 | Minimal | Minimal | ◯ | ◯ | ◯ |
| | Example 4 | Not Observed | Minimal | ◯ | Δ | Δ |
| | Example 5 | Minimal | Small | — | ◯ | ◯ |
| | Example 6 | Not Observed | Small | — | ◯ | ◯ |
| | Example 7 | Not Observed | Minimal | Δ | ◯ | ◯ |
| | Example 9 | Minimal | Middle | — | ⊚ | ⊚ |
| | Example 10 | Not Observed | Middle | — | ◯ | ◯ |
| Example Nickel-based Alloy | Example 1 | Minimal | Not Observed | ◯ | ◯ | ◯ |
| | Example 2 | Minimal | Minimal | ◯ | ◯ | ◯ |
| | Example 3 | Minimal | Minimal | ◯ | Δ | Δ |
| | Example 4 | Not Observed | Minimal | ◯ | Δ | Δ |
| | Example 5 | Not Observed | Small | — | Δ | Δ |
| | Example 6 | Not Observed | Small | — | Δ | Δ |
| | Example 7 | Minimal | Minimal | Δ | ◯ | ◯ |
| | Example 8 | Minimal | Minimal | ◯ | ◯ | ◯ |
| | Example 9 | Not Observed | Small | — | ◯ | ◯ |
| | Example 10 | Not Observed | Small | — | Δ | Δ |
| | Example 11 | Minimal | Minimal | Δ | ◯ | ◯ |
| | Example 12 | Not Observed | Minimal | ◯ | Δ | Δ |
| | Example 13 | Minimal | Minimal | ◯ | ◯ | ◯ |
| | Example 14 | Minimal | Minimal | ◯ | ◯ | ◯ |

Table 3 above summarizes combinations of high-output type vibration driven motors with the structure

Initial Wear

In the column of "initial wear" of Table 3, since the friction surface containing tungsten carbide and cobalt (to be referred to as a WC-Co friction surface hereinafter) of the Comparative Example has very high hardness, the initial wear (scratches) of the vibration member need not be considered, and only the wear of the composite resin layer need be considered. In the alloy film of the nickel-based intermetallic compound, the initial wear was relatively large and stripe-like scratches were observed from some examples due to a hardness relatively lower than that of the WC-Co friction surface.

In combinations of the WC-Co friction surface of the Comparative Example and the composite resins, the initial wear amounts of the composite resins of Example 5 in which metal molybdenum was blended as a wear modifier in nonthermoplastic polyimide and of Example 6 in which no wear modifier was blended are "small", and the initial wear amounts of the composite resins of Example 9 in which glassy carbon (1) was blended as a wear modifier in thermoplastic polyimide and of Example 10 in which calcium carbonate was blended are still larger, i.e., "middle".

In combinations of the alloy film of the nickel-based intermetallic compound of the Example and the composite resins, the initial wear amounts of Examples 5 and 6 using nonthermoplastic polyimide and Examples 9 and 10 using the thermoplastic polyimide are "small". Thus, in these combinations, it was confirmed that the wear amounts with respect to the compound resins were relatively smaller than the WC-Co friction surface.

It was also found that an initial wear difference among the composite resins of Examples 1, 3, 4, and 7 by the hardening treatment of the vibration members was very small.

When the results of Examples 3 and 8 are examined in combination, the composite resins of the nonthermoplastic polyimide and thermoplastic polyimide filled with the carbon fiber or glassy carbon (2) as a wear modifier have a wear resistance equivalent to that of a combination of the nickel-based intermetallic compound alloy film and the WC-Co film. Note that it was found that a combination of the nickel-based alloy film with a composite resin prepared by filling and blending a fiber-type reinforcement material such as a carbon fiber in a thermoplastic resin having a glass transition point of 100° C. or higher, was also effective in terms of the initial wear.

Torque Nonuniformity

The torque nonuniformity will be discussed below. Upon comparison of Examples 1, 3, 4, and 7 in which the initial wear amounts of the composite resins with respect to the friction surfaces of the vibration members of the Comparative Example and Example were "not observed" or "minimal", when the composite resin of Example 1 in which the carbon fiber was filled and blended in nonthermoplastic polyimide was combined with the vibration member of the Comparative Example, the torque nonuniformity was about 5%, and was evaluated as "Δ", while when the composite resin of Example 1 was combined with the vibration member of the Example, the torque nonuniformity was about 3%, and was evaluated as "◯".

The torque nonuniformity of each of the composite resins of Examples 3 and 4 in which the glassy carbon (2) or (1) and the metal molybdenum powder were blended in nonthermoplastic polyimide was evaluated as "◯" for both the vibration members of the Comparative Example and Example. However, the composite resin of Example 7 in which the carbon fiber was blended in thermoplastic polyimide was evaluated as "◯" in combination with either vibration member.

When the friction surface of the vibration member of the Example was combined with each of the composite resins of Example 2 in which the glassy carbon (2) was blended in nonthermoplastic polyimide, Example 8 in which the glassy carbon (2) was blended in thermoplastic polyimide, and Examples 12, 13, and 14 in which the potassium titanate whisker (TiSMo) or the carbon fibers was blended in polyether ether ketone (PEEK), polyether sulfone (PES), and liquid-crystal aromatic polyester (LCP) having a glass transition point of 100° C. or more, the torque nonuniformity was evaluated as "◯".

Conventionally, torque nonuniformity is considered to be caused by low density and uniformity of the surface property of the friction surface of the vibration member or the slide surface of the composite resin layer. However, in practice, the torque nonuniformity is influenced by especially an actual pressure of a wear powder of the composite resin between the friction surface and the slide surface, and in particular, the wear powder of the composite resin nonuniformly attached or adhered to the friction surface of the vibration member poses a problem.

Therefore, in combinations whose initial wear amounts of the composite resins were evaluated as "small" or "middle" in Table 3, torque nonuniformity of the motor was not evaluated.

Rated Output, Maximum Efficiency

Upon evaluation of the hardened films of the vibration members on the basis of the rated outputs of the motor in Table 3, the evaluation results of Examples 4 and 7 remained the same between the vibration members of the WC-Co hardened film and the nickel-based intermetallic compound alloy film. However, in Examples 1, 3, 5, 6, 9, and 10, a decrease in rated output was observed between the vibration members although it was small. The difference in output is caused by a difference in surface property of the friction surface such as the hardness or roughness of the hardened film. In particular, the surface roughness of the WC-Co friction surface was about 0.35 $\mu$mRa (central axis average roughness (Ra)), while the surface roughness of the nickel-based intermetallic compound alloy film was 0.22 $\mu$mRa. In this manner, the surface roughnesses of these films were slightly different from each other, and it was assumed that such a difference was caused by a difference in coefficient of friction of the friction surface with the slide member of the composite resin. Re-evaluation was needed with at least equal surface roughnesses of the friction surfaces of the vibration members.

Upon comparison of the "rated output" or "maximum efficiency" of the slide members of the composite resins, good evaluation results were obtained from Examples 1, 7, 11, 13, and 14 in which the carbon fiber was blended as a wear modifier, and from Examples 2, 8, and 9 in which the glassy carbon (2) or (1) was blended.

As described above, according to the present invention, since the friction surface is formed by an alloy film, which has higher density, proper hardness, and excellent corrosion and wear resistances, the torque nonuniformity can be eliminated, and the composite resin can be effectively prevented from being worn since the friction surface does not suffer from formation of recess portions.

Conventionally, when tungsten carbide and cobalt are spray-coated on the interdigital friction surface of the vibration member formed, the vibration member is fixed by cement so as to prevent a spray-coated material from being attached to a portion other than the friction surface, resulting in considerably high cost and poor mass-productivity. However, according to the present invention, since a very low-cost masking process can replace the above-mentioned high-cost process, high mass-productivity can be assured, and cost can be reduced to about 1/10 as compared to the conventional motor.

I claim:

1. A vibration driven motor comprising;
    a vibration member having a contact surface and for generating a vibration therein in response to a signal applied thereto; and
    a contact ember having a contact surface which is in contact with the contact surface of said vibration member, said vibration causing relative movement between the vibration member and the contact member, and
    the contact surface of said contact member having a composite resin layer having a Rockwell hardness ($H_RM$) of 80 to 110, and the contact surface of said vibration member being formed of a multi-layered film of an intermetallic compound of nickel having a Vickers hardness (Hv) of 800 to 1,200.

2. A motor according to claim 1, wherein the multi-layered film of the intermetallic compound consists of at least two layers including a nickel-phosphorus (Ni-P) layer and a nickel-phosphorus-tungsten (Ni-P-W) layer.

3. A motor according to claim 1, wherein a base material of said vibration member is martensite-based stainless steel.

4. A motor according to claim 1, wherein a base material resin of the composite resin layer is a nonthermoplastic aromatic polyimide resin.

5. A motor according to claim 1, wherein a base material resin of the composite resin layer is a thermoplastic resin having a glass transition point of not less than 100° C.

6. A motor according to claim 5, wherein the thermoplastic resin is thermoplastic polyimide.

7. A motor according to claim 1, wherein the composite resin layer contains a wear modifier, and the wear modifier is 10 to 30 wt % of a fiber-type reinforcement material.

8. A motor according to claim 1, wherein the composite resin layer contains a wear modifier, and the wear modifier is 10 to 50 wt % of granular or spheroidal glassy carbon.

9. A motor according to claim 1, wherein the composite resin layer contains 1 to 10 wt % of a fluorocarbon resin as a friction regulator.

10. A motor according to claim 1, wherein a thickness of the multi-layered film falls within a range between 10 $\mu$m and 50 $\mu$m.

11. A vibration driven motor or apparatus comprising;
    a vibration member having a contact surface and for generating a travelling wave therein in response to an electrical signal applied thereto;
    a contact member having a contact surface which is in pressure contact with the contact surface of said vibration member, said wave causing relative movement between the vibration member and the contact member, and
    the contact surface of said contact member having a composite resin layer having a Rockwell hardness ($H_RM$) of 80 to 110, and the contact surface of said vibration member being formed of a multi-layered film of an intermetallic compound of nickel having a Vickers hardness (Hv) of 800 to 1,200.

* * * * *

UNITED STATES PATENT AND TRADEMARK OFFICE
CERTIFICATE OF CORRECTION

PATENT NO. : 5,329,201  
DATED : July 12, 1994  
INVENTOR(S) : SHIRASAKI

Page 1 of 2

It is certified that error appears in the above-indentified patent and that said Letters Patent is hereby corrected as shown below: On the title page:

Item: [56] References Cited

U.S. Patent Documents, insert   Class /Subclass
--5,034,646  7/91  Shirasaki ... 310/ 323
  5,148,075  9/92  Shirasaki ... 310/323

Column 2

Line 51 "has" should read --has a--.

Column 11

TABLE 3,

"

| Vibration Member | Composite Resin | Initial Wear" |
|---|---|---| should read

| -- Initial Wear -- | |
|---|---|
| Vibration Member | Composite Resin |

UNITED STATES PATENT AND TRADEMARK OFFICE
CERTIFICATE OF CORRECTION

PATENT NO. : 5,329,201  
DATED : July 12, 1994  
INVENTOR(S) : SHIRASAKI

Page 2 of 2

It is certified that error appears in the above-indentified patent and that said Letters Patent is hereby corrected as shown below:

<u>Column 12</u>

Line 12, "rated results" should read --rated conditions (4 kg. cm, 100 rpm), and the measurement results--.

<u>Column 14</u>

Line 9, " "O" " should read -- "Δ"--.

<u>Column 15</u>

Line 23, "comprising;" should read --comprising:--.
Line 27, "ember" should read --member--.

<u>Column 16</u>

Line 28, "ing;" should read --ing:--.

Signed and Sealed this

Twenty-second Day of November, 1994

Attest:

BRUCE LEHMAN

Attesting Officer        Commissioner of Patents and Trademarks